(12) United States Patent
Fujiwara et al.

(10) Patent No.: US 8,802,267 B2
(45) Date of Patent: Aug. 12, 2014

(54) TEMPERATURE ADJUSTING STRUCTURE FOR ELECTRIC STORAGE MODULE

(75) Inventors: Nobuyoshi Fujiwara, Toyota (JP); Junta Katayama, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 279 days.

(21) Appl. No.: 13/133,992

(22) PCT Filed: Nov. 6, 2009

(86) PCT No.: PCT/JP2009/005894
§ 371 (c)(1),
(2), (4) Date: Jun. 10, 2011

(87) PCT Pub. No.: WO2010/073466
PCT Pub. Date: Jul. 1, 2010

(65) Prior Publication Data
US 2011/0318627 A1    Dec. 29, 2011

(30) Foreign Application Priority Data
Dec. 24, 2008    (JP) .................................. 2008-328846

(51) Int. Cl.
*H01M 10/50* (2006.01)
*B60K 11/00* (2006.01)
*B60R 16/04* (2006.01)

(52) U.S. Cl.
USPC ......... 429/120; 180/68.1; 180/68.2; 180/68.5

(58) Field of Classification Search
USPC .................... 429/120; 180/68.1, 68.2, 68.5
See application file for complete search history.

(56) References Cited

U.S. PATENT DOCUMENTS

| 2006/0093901 A1* | 5/2006 | Lee et al. | 429/120 |
| 2006/0172188 A1* | 8/2006 | Okuda et al. | 429/120 |
| 2007/0292752 A1* | 12/2007 | Tsuchiya | 429/120 |
| 2009/0260905 A1* | 10/2009 | Shinmura | 180/68.1 |

FOREIGN PATENT DOCUMENTS

| JP | 2004-161058 | 6/2004 |
| JP | 2006-224798 | 8/2006 |
| JP | 2006-347318 | 12/2006 |
| JP | 2007-331737 | 12/2007 |
| JP | 2008-080930 | 4/2008 |
| JP | 2008-278705 | 11/2008 |
| WO | WO 2007043341 A1 * | 4/2007 |
| WO | WO 2009/081764 A1 | 7/2009 |

OTHER PUBLICATIONS

International Search Report in International Application No. PCT/JP2009/005894; Mailing Date: Jan. 19, 2010.

* cited by examiner

*Primary Examiner* — Eugenia Wang
(74) *Attorney, Agent, or Firm* — Finnegan, Henderson, Farabow, Garrett & Dunner, LLP

(57) ABSTRACT

A temperature adjusting structure adjusting the temperature of an electric storage module mounted on a vehicle has an intake path which takes in air in the vehicle interior from an intake port and guides the air to the electric storage module located below a horizontal plane on which the intake port is located. A bottom face of the intake path has an inclined face extending upward from a lower end portion of the intake port and facing the intake port.

7 Claims, 6 Drawing Sheets

TEMPERATURE ADJUSTING STRUCTURE FOR ELECTRIC STORAGE MODULE

CROSS-REFERENCE TO RELATED APPLICATIONS

This application is a national phase application of International Application No. PCT/JP2009/005894, filed Nov. 6, 2009, and claims the priority of Japanese Application No. 2008-328846, filed Dec. 24, 2008, the contents of both of which are incorporated herein by reference.

TECHNICAL FIELD

The present invention relates to a temperature adjusting structure for adjusting the temperature of an electric storage module mounted on a vehicle.

BACKGROUND ART

Conventionally, there has been a structure for guiding air in a vehicle interior to a battery pack to suppress a rise in temperature of the battery pack. In the structure, an intake port for taking in air is provided in the vehicle interior, and the air taken in from the intake port is guided to the battery pack through a duct. The intake port is opened toward the vehicle interior. When a passenger spills a liquid such as a drink in the vehicle interior, the liquid may enter the duct through the intake port.

To address this, there is a configuration in which beads are placed on a movement path of air to prevent any liquid entering through an intake port from reaching a battery pack (see, for example, Patent Document 1).

[Patent Document 1] Japanese Patent Laid-Open No. 2006-224798 (FIGS. 2 and 3)

DISCLOSURE OF THE INVENTION

Problems to be Solved by the Invention

In the configuration described in Patent Document 1, a liquid entering through the intake port is housed primarily in a tank. However, the liquid housed in the tank may be moved to a duct depending on the running state of a vehicle or the like. In addition, when the beads are provided, the shape of the path for moving the air may be complicated.

It is thus an object of the present invention to provide a temperature adjusting structure including an intake path for guiding air in the vehicle interior to an electric storage module wherein, even when a foreign matter such as a liquid enters the intake path, the foreign matter can be discharged easily to the outside of the intake path.

Means for Solving the Problems

The present invention provides a temperature adjusting structure for adjusting the temperature of an electric storage module mounted on a vehicle, including an intake path taking in air in a vehicle interior from an intake port and guiding the air to the electric storage module located below a horizontal plane on which the intake port is located. A bottom face of the intake path has an inclined face, and the inclined face extends upward from a lower end portion of the intake port and faces the intake port. An opening plane of the intake port is substantially orthogonal to the horizontal plane or is inclined with respect to the horizontal plane to be directed upward.

The intake path can be bent at an upper end portion of the inclined face. Thus, even when a liquid enters through the intake port, the liquid can be hit against the bent portion to prevent further entrance of the liquid.

The intake path can be formed of a first duct and a second duct connected to the first duct and located upstream from the first duct in a movement path of the air. In a connecting portion of the first and second ducts, an end portion of the second duct can be located inside the first duct and an inner face of the first duct located in a bottom portion thereof can be separate from an outer face of the second duct in the state in which the inner face of the first duct is opposite to the outer face of the second duct in a vertical direction. This can form an opening portion at the connecting portion of the first and second ducts. When a liquid enters the intake path, the liquid can be discharged through the opening portion. In addition, since the opening direction of the opening portion is substantially opposite to the movement direction of the air, a leak of the air through the opening portion can be suppressed.

The first duct can be placed to extend above the connecting position with the second duct. Even when a liquid is contained in the air guided from the second duct, the liquid can be attached easily to the inner face of the first duct. Then, the attached liquid can be directed to the opening portion by the self-weight and discharged to the outside of the intake path.

In the configuration in which the intake path guides the air to the electric storage module from the side where a bottom face of the electric storage module is located, a protruding face and a discharge port can be provided for the intake path. The protruding face is formed in a region opposite to the bottom face of the electric storage module in the vertical direction and protrudes toward the electric storage module. The discharge port discharges a foreign matter moved downward along the protruding face to the outside of the intake path. Thus, even when the foreign matter (for example, a liquid) is attached to the protruding face of the intake path, the foreign matter can be moved downward along the protruding face and gathered in a portion. When the foreign matter can be gathered in the portion, the foreign matter can be discharged easily through the discharge port.

The protruding face can be formed such that a distance between the protruding face and a first region of the bottom face of the electric storage module in the vertical direction is larger than a distance between the protruding face and a second region of the bottom face of the electric storage module in the vertical direction, the second region having higher heat radiation than the first region. Consequently, different amounts of air can be supplied to the first and second regions of the electric storage module, thereby making it possible to suppress variations in temperature between the first and second regions.

Effect of the Invention

According to the present invention, even when the foreign matter such as a liquid enters the intake path from the intake port, the foreign matter can be discharged to the outside of the intake path by using the inclined face. In addition, since it is only required to provide the inclined face in the bottom face of the intake path, the foreign matter can be discharged easily while the structure can be simplified.

EMBODIMENT(S) OF THE INVENTION

An embodiment of the present invention will hereinafter be described.

Embodiment 1

Figure 1:
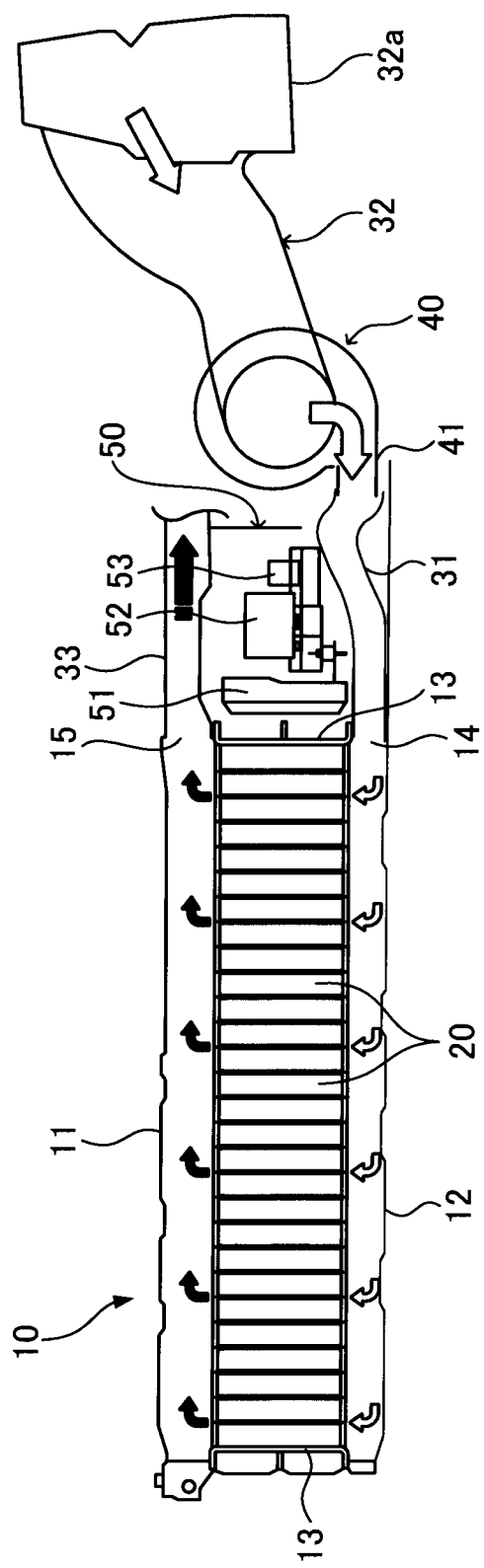
FIG. 1 A schematic diagram showing the configuration of a temperature adjusting structure which is Embodiment 1 of the present invention.
Figure 2:
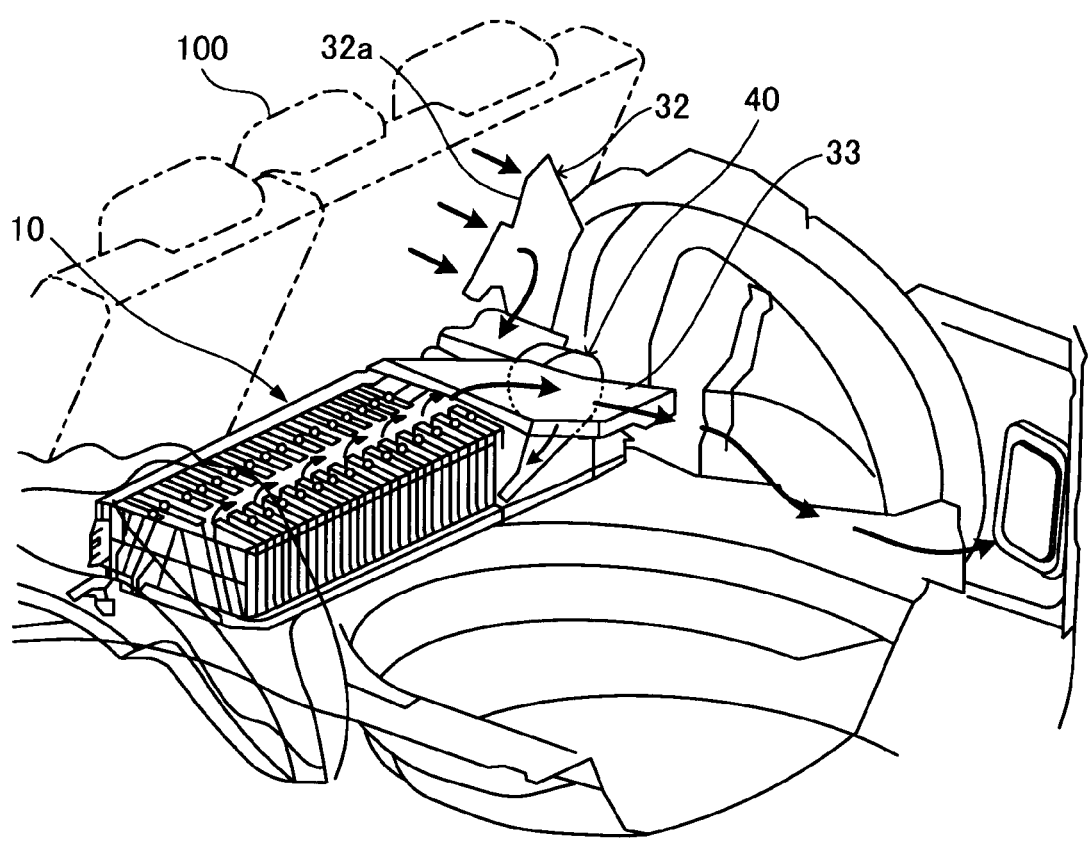
FIG. 2 A schematic diagram showing the temperature adjusting structure of Embodiment 1 mounted on a vehicle.

A temperature adjusting structure which is Embodiment 1 of the present invention will be described with reference to FIG. 1 and FIG. 2. FIG. 1 is a schematic diagram showing the structure for adjusting the temperature of a battery pack, and FIG. 2 is a schematic diagram of the temperature adjusting structure mounted on a vehicle. A battery pack 10 according to the present embodiment is mounted on the vehicle and is used as a power source of the vehicle. Examples of the vehicle include hybrid vehicles and electric vehicles.

The hybrid vehicle is a vehicle having not only the battery pack 10 but also another power source such as an internal combustion engine or a fuel cell which outputs energy for use in running of the vehicle. The electric vehicle is a vehicle which relies totally on the output from the battery pack 10 for running. The battery pack 10 is discharged to output energy for use in running of the vehicle or is charged with regenerative electric power obtained from kinetic energy generated in braking of the vehicle. The battery pack 10 may also be charged with electric power supplied from the outside of the vehicle.

As shown in FIG. 2, the battery pack 10 is placed behind a backseat 100 placed in the vehicle interior. Space formed above the battery pack 10 is used as a luggage room. The position to place the battery pack 10 is not limited to the position shown in FIG. 2 and can be set as appropriate in view of the layout in the vehicle interior.

The battery pack 10 has an upper case 11 and a lower case 12 which form space for housing a plurality of battery modules (electric storage modules) 20. The upper case 11 has faces opposite to upper faces and side faces of the battery modules 20. Space is formed between the upper faces of the battery modules 20 and the upper face of the upper case 11, and the space is used as a path (ejection path) for discharging air from the battery modules 20, as described later.

The upper case 11 are fixed to the lower case 12 and the plurality of battery modules 20 are also fixed to the lower case 12. Some region of the lower case 12 is separate from bottom faces of the battery modules 20 and this space is used as a path (intake path) for supplying air to the battery modules 20, as described later.

The plurality of battery modules 20 are placed side by side in one direction (left-right direction in FIG. 1), and are connected electrically in series through bus bars (not shown). A general negative cable and a general positive cable for use in charge and discharge of the battery modules 20 are connected to particular ones of the plurality of battery modules 20. The cables are connected to equipment such as a DC/DC converter and an inverter.

The plurality of battery modules 20 are sandwiched between a pair of end plates 13 at both ends in the arrangement direction. Space for passing air is formed between the two battery modules 20 adjacently placed, as described later. A restraint rod (not shown) extending in the arrangement direction of the battery modules 20 is connected to the pair of end plates 13 to provide a restraint force for the plurality of battery modules 20 through the end plates 13. It should be noted that the restraint rod and the end plates 13 may be omitted to employ a structure in which no restraint force is provided for the plurality of battery modules 20.

The battery module 20 has a plurality of cells (not shown) connected electrically in series. The plurality of cells are placed side by side in a direction orthogonal to the arrangement direction of the battery modules 20, that is, in a direction orthogonal to the sheet of FIG. 1. A secondary battery such as a nickel metal hydride (NiMH) battery or a lithium-ion battery can be used as the cell. An electric double layer capacitor may be used instead of the secondary battery. The number of the cells constituting the battery module 20 or the number of the battery modules 20 can be set as appropriate. While the plurality of battery modules 20 each formed of the plurality of cells are arranged in one direction in the present embodiment, the present invention is not limited thereto, and it is possible to employ a structure in which the cells are arranged in one direction.

One end of a first intake duct 31 forming part of the intake path is connected to an opening portion 14 provided in a lower portion of the battery pack 10, and a duct portion 41 of a fan 40 is connected to the other end of the first intake duct 31. The specific structure of the first intake duct 31 will be described later.

The lower case 12 of the battery pack 10 is located below the first intake duct 31. Specifically, in the present embodiment, the lower case 12 extends to the space located below the first intake duct 31 and the fan 40. The first intake duct 31 and the fan 40 are fixed to the lower case 12. Such a configuration allows the battery modules 20, the fan 40 and the like to be treated as one unit and mounted easily on the vehicle.

One end of a second intake duct 32 forming part of the intake path is connected to the fan 40, and an intake port 32a for taking in air in the vehicle interior is provided at the other end of the second intake duct 32. The intake port 32a faces the vehicle interior and is located above the horizontal plane on which the battery modules 20 are located as shown in FIG. 1. Specifically, the air taken in from the intake port 32a is moved downward and guided to the battery modules 20. The intake port 32a is placed at the position adjacent to the seatback of the backseat 100 and near a seat cushion (see FIG. 2). The vehicle interior refers to space where a passenger rides. While the intake port 32a is provided at the abovementioned position in the present embodiment, the present invention is not limited thereto, and the position can be set as appropriate. In the present invention, however, the plane including the intake port 32a needs to be inclined with respect to the horizontal plane, and for example, the intake port 32a can be placed so as to be substantially orthogonal to the horizontal plane.

One end of an ejection duct 33 is connected to an opening portion 15 provided in an upper portion of the battery pack 10. The ejection duct 33 extends to the outside of the vehicle and discharges the air from the battery modules 20 to the outside of the vehicle. It should be noted that part of the ejection duct 33 may be omitted and that the path for discharging the air may be formed by using a vehicle body or an interior part.

A case 50 is placed in space formed between the first intake duct 31 and the ejection duct 33. The case 50 is placed at the position adjacent to the battery pack 10 in the arrangement direction of the battery modules 20. Equipment for controlling charge and discharge of the battery modules 20 and the like is placed in the case 50. Examples of the equipment include a controller 51 for determining the state of the battery modules 20, a relay 52, and a current sensor 53.

Next, description will be made of the temperature adjustment of the battery modules 20 in the abovementioned temperature adjusting structure. Arrows shown in FIGS. 1 and 2 indicate the movement directions of air used in the temperature adjustment of the battery modules 20. White-color arrows shown in FIG. 1 indicate the movement directions of air before contact with the battery modules 20, and black-color arrows indicate the movement directions of air after contact with the battery modules 20.

When the fan 40 is driven, the air in the vehicle interior is taken into the second intake duct 32 through the intake port 32a, passes through the fan 40 and the first intake duct 31, and is moved into the battery pack 10. As described above, part of the lower case 12 is separate from the bottom faces of the battery modules 20, so that the air guided from the first intake duct 31 is moved along the lower case 12 to reach all of the battery modules 20. In other words, the air is supplied to the battery modules 20 from the bottom face side. Then, the air moved along the lower case 12 enters the space formed between the adjacently placed battery modules 20.

The air is brought into contact with each of the battery modules 20 to achieve heat exchange between the air and the battery modules 20. Specifically, when the battery modules 20 generate heat due to charge and discharge or the like, the air takes heat out of the battery modules 20 to suppress a rise in temperature of the battery modules 20. On the other hand, when the battery modules 20 are excessively cooled by the ambient temperature, the air supplies heat to the battery modules 20 to suppress a drop in temperature of the battery modules 20. In this manner, the air is brought into contact with the battery modules 20 to allow the temperature adjustment of the battery modules 20.

The air after the heat exchange with the battery modules 20 is moved to the space formed above the battery modules 20. Then, the air is moved along the upper case 11 toward the opening portion 15. The air after the heat exchange passes through the opening portion 15, is guided to the ejection duct 33, and is discharged to the outside of the vehicle thorough the ejection duct 33.

Figure 3:
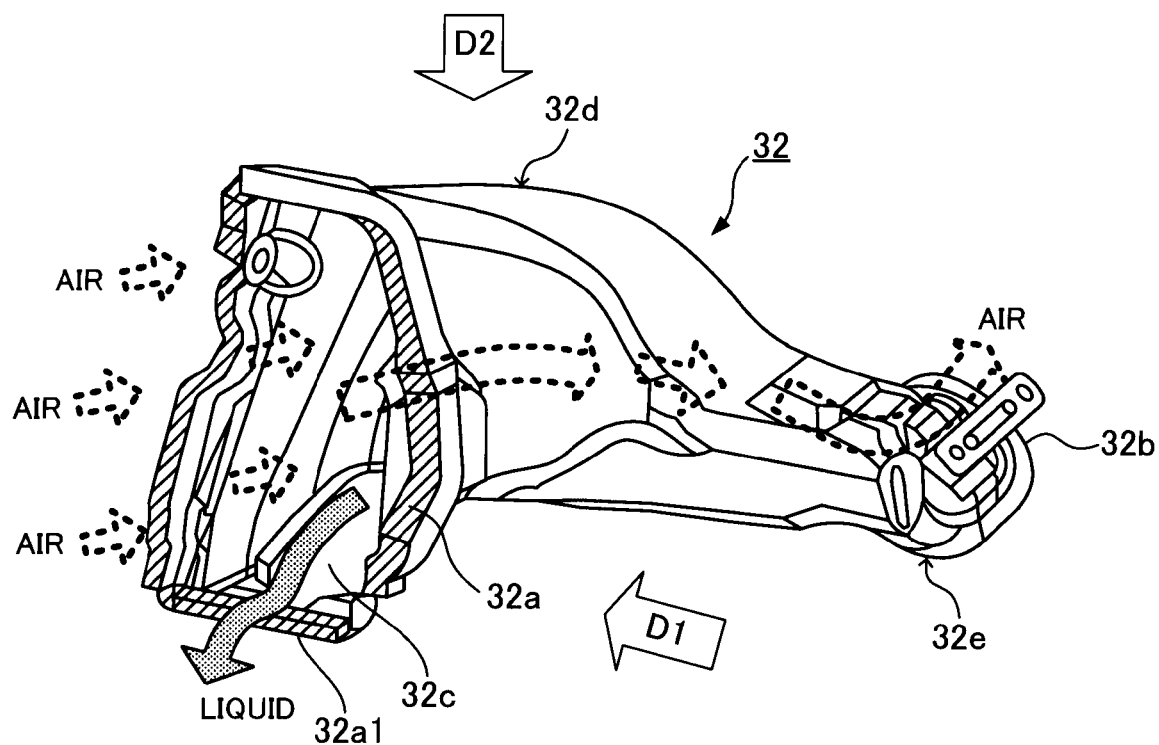
FIG. 3 A perspective view showing the outer appearance of the configuration of a second intake duct in Embodiment 1.
Figure 4:
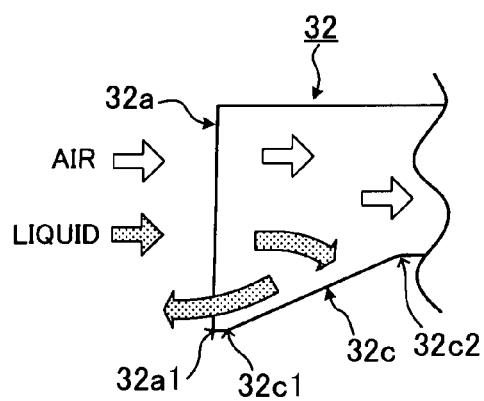
FIG. 4 A schematic diagram showing the inner structure of the second intake duct in Embodiment 1.
Figure 5:
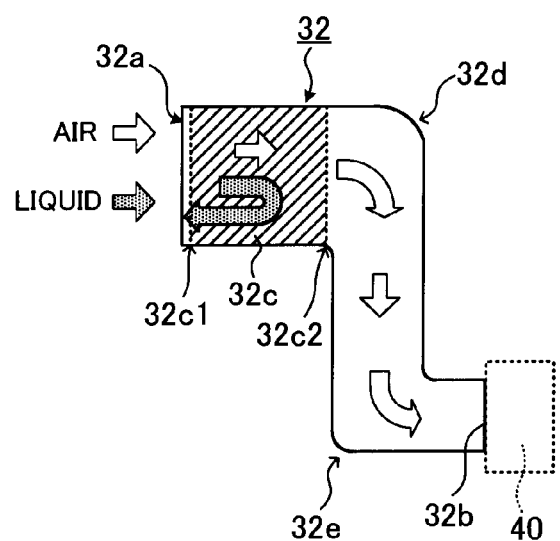
FIG. 5 A schematic diagram showing the inner structure of the second intake duct in Embodiment 1.

Next, description will be made of the specific structure of the second intake duct 32 with reference to FIG. 3 to FIG. 5. FIG. 3 is a perspective view showing the outer appearance of the second intake duct 32. FIG. 4 is a schematic diagram showing the inside of the second intake duct 32 when viewed from a direction indicated by an arrow D1 in FIG. 3. FIG. 5 is a schematic diagram showing the inside of the second intake duct 32 when viewed from a direction indicated by an arrow D2 in FIG. 3.

As shown in FIG. 3, the second intake duct 32 has the intake port 32a at one end and a connection port 32b for connection to the fan 40 at the other end. A cover (not shown) having a plurality of opening portions is attached to the intake port 32a such that any foreign matter is prevented from entering the second intake duct 32.

An inclined face 32c is provided in a bottom portion of the second intake duct 32. As shown in FIG. 4, the inclined face 32c extends upward with respect to a lower end portion 32a1 of the intake port 32a. The inclined face 32c is placed to face the intake port 32a. A lower end portion 32c1 of the inclined face 32c is located within the same plane (within the horizontal plane) as the lower end portion 32a1 of the intake port 32a. While the lower end portions 32a1 and 32c1 are provided at the different positions within the horizontal plane as shown in FIG. 4 in the present embodiment, the present invention is not limited thereto, and the lower end portions 32a1 and 32c1 may be provided at the same positions. In other words, the inclined face 32c may extend from the lower end portion 32a1 of the intake port 32a. The inclined face 32c may be formed by using at least one of a flat face and a curved face.

The second intake duct 32 has two bent portions 32d and 32e. The bent portion 32d is provided at the portion where an upper end portion 32c2 of the inclined face 32c is located.

According to the present embodiment, the inclined face 32c is provided for the second intake duct 32, and even when any liquid enters the second intake duct 32 through the intake port 32a, the liquid can be moved easily to the outside of the second intake duct 32. The liquid passing through the intake port 32a and reaching the inclined face 32c is subjected to gravity to move along the inclined face 32c toward the intake port 32a. Then, the liquid is discharged to the outside through the intake port 32a. FIG. 3 to FIG. 5 show the movement paths of the air and the liquid.

Since it is only required to provide the inclined face 32c for the second intake duct 32 in the present embodiment, the liquid can be discharged in the simple configuration.

The intake port 32a is placed at the position adjacent to the seat cushion of the backseat 100 in the present embodiment (see FIG. 2). Thus, for example when a passenger spills a liquid such as a drink, the liquid may enter from an upper portion of the intake port 32a. In such a case, most of the liquid entering through the intake port 32a reaches the inclined face 32c, so that the liquid can be discharged easily to the outside of the second intake duct 32 by using the inclined face 32c.

In the present embodiment, the bent portion 32d provided at the upper end portion 32c2 of the inclined face 32c can suppress the movement of the liquid beyond the bent portion 32d toward the connection port 32b. Specifically, the provision of the bent portion 32d allows the liquid entering through the intake port 32a to be hit against the inner wall face of the bent portion 32d to prevent further entrance of the liquid. It should be noted that the bent portion 32d may not be provided for the second intake duct 32 and that only the inclined face 32c may be used to discharge the liquid.

The size and the inclination angle of the inclined face 32c can be set as appropriate in consideration of the discharge of the liquid entering through the intake port 32a to the outside. The inclination angle of the inclined face 32c with respect to the horizontal plane may be larger than 0 degrees and smaller than 90 degrees. It is only required that the second intake duct 32 should have the function of the inclined face 32c described in the present embodiment, and the shape of the second intake duct 32 can be set as appropriate.

Figure 6:
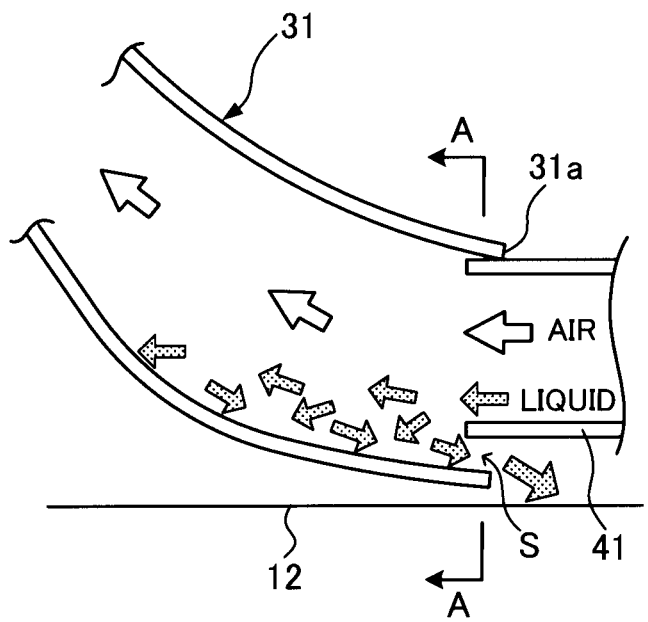
FIG. 6 An enlarged view showing a connecting portion of a first intake duct and a fan in Embodiment 1.
Figure 7:
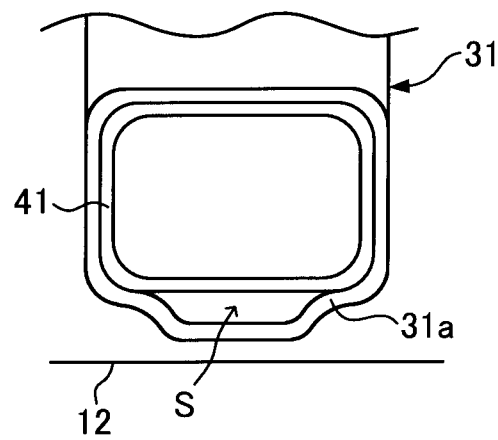
FIG. 7 A section view taken along a line A-A in FIG. 6.

Next, the structure of the first intake duct 31 will be described specifically with reference to FIG. 6 and FIG. 7. FIG. 6 is an enlarged view showing the connecting portion of the first intake duct 31 and the fan 40. FIG. 7 is a section view taken along a line A-A in FIG. 6.

A connecting portion 31a located at one end of the first intake duct 31 is connected to the duct portion 41 of the fan 40. Specifically, an inner wall face of the connecting portion 31a is in contact with an outer wall face of the duct portion 41.

A seal material may be placed between the connecting portion 31a and the duct portion 41.

On the other hand, some region of the connecting portion 31a that is located in a lower portion is separate outward from the outer wall face of the duct portion 41, and a discharge port S is formed between the connecting portion 31a and the duct portion 41. At the discharge port S, the inner wall face of the first intake duct 31 is opposite to the outer wall face of the duct portion 41 in the vertical direction. As shown in FIG. 1, the first intake duct 31 has a region bent to protrude upward. FIG. 6 shows the region of the first intake duct 31 that extends upward from the connecting position with the duct portion 41.

The portion of the first intake duct 31 extends upward from the connecting position with the duct portion 41 in this manner, so that even when any liquid is contained in the air guided from the fan 40, the liquid and the air can be separated. If any liquid is contained in the air guided from the fan 40, the liquid can be attached to the inner wall face of the first intake duct 31. When the amount of the liquid attached to the inner wall face of the first intake duct 31 is increased or the driving of the fan 40 is stopped, the liquid is moved along the inner wall face of the first intake duct 31 toward the discharge port S.

Thus, the liquid can be discharged to the outside of the first intake duct 31 through the discharge port S. This can prevent the air containing the liquid from reaching the battery module 20 through the first intake duct 31.

In the present embodiment, the discharge port S can be formed only by connecting the first intake duct 31 to the duct portion 41. In other words, it is only required that the connecting portion 31a in the first intake duct 31 should be formed in the shape shown in FIG. 7. This can easily provide the discharge port S as compared with the case where the discharge port S as in the present embodiment is formed integrally with one duct.

In the present embodiment, the discharge port S is formed in the configuration in which the duct portion 41 is located inside the connecting portion 31a. In this configuration, as shown in FIG. 6, the opening direction of the discharge port S can be opposite to the movement direction of the air which moves from the duct portion 41 toward the first intake duct 31. This can make it difficult for the air supplied toward the battery module 20 to be discharged through the discharge port S and only the liquid can be discharged efficiently through the discharge port S.

While the portion of the first intake duct 31 extends upward from the connecting position with the duct portion 41 in the present embodiment, the present invention is not limited thereto. Specifically, the first intake duct 31 may be placed to extend along the movement direction of the air from the duct portion 41. In other words, the first intake duct 31 can be placed along the horizontal direction without providing any bent portion for the first intake duct 31. In such a configuration, part of the connecting portion 31a can also be separate from the outer wall face of the duct portion 41 to form the discharge port S to discharge the liquid through the discharge port S.

The sectional shapes of the first intake duct 31 and the duct portion 41 are not limited to those shown in FIG. 7 and can be set as appropriate. Specifically, in the connecting structure in which the duct portion 41 is located inside the first intake duct 31, some region of the first intake duct 31 may be located in a lower portion is separate from the outer wall face of the duct portion 41 and the other region of the first intake duct 31 may be in contact with the outer wall face of the duct portion 41.

In addition, while the fan 40 is placed on the path (intake path) on which the air is guided from the intake port 32a to the battery module 20 in the present embodiment, the present invention is not limited thereto. Specifically, it is only required that the fan 40 should be driven to allow the air in the vehicle interior to be guided to the battery module 20. For example, the fan 40 may be connected to the ejection duct 33. Since the first intake duct 31 and the second intake duct 32 are connected to each other in such a configuration, the connecting structure of the intake ducts 31 and 32 may be formed to have the configuration shown in FIG. 6.

Figure 8:
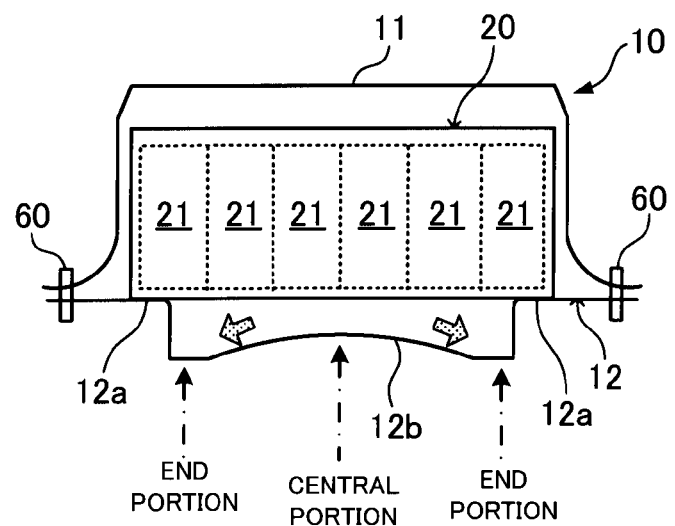
FIG. 8 A schematic diagram showing the inner structure of a battery pack when viewed from the arrangement direction of battery modules in Embodiment 1.

Next, the structure of the lower case 12 in the battery pack 10 will be specifically described with reference to FIG. 8. FIG. 8 is a schematic diagram showing the battery pack 10 when viewed from the arrangement direction of the battery modules 20.

As shown in FIG. 8, the upper case 11 and the lower case 12 are fixed to each other by fastening members 60. The battery module 20 has the plurality of cells 21 placed side by side in one direction (left-right direction in FIG. 8), and the cells 21 are connected electrically in series.

The lower case 12 has a face 12a supporting the battery modules 20 and a face 12b separate from the bottom faces of the battery modules 20. The faces 12a and 12b extend in a direction orthogonal to the sheet of FIG. 8. Each of the battery modules 20 is fixed to the face 12a of the lower case 12 by fastening members (not shown).

The face 12b of the lower case 12 is formed of a curved face which protrudes toward the bottom faces of the battery modules 20. The central portion of the face 12b is the closest to the bottom faces of the battery modules 20, and both end portions of the face 12b are the farthest from the bottom faces of the battery modules 20. The distance from the bottom faces of the battery modules 20 (the length in the vertical direction) is continuously increased from the central portion toward both end portions of the face 12b.

While the face 12b is formed such that the distance from the bottom faces of the battery modules 20 is continuously changed in the present embodiment, the present invention is not limited thereto. Specifically, the face 12b can be formed such that the distance from the bottom faces of the battery modules 20 is changed stepwise.

When any liquid is contained in the air guided to the space (intake path) formed between the battery modules 20 and the lower case 12 in the abovementioned configuration, the liquid is attached to the face 12b. Since the face 12b is formed of the protruding face, the liquid attached to the face 12b is moved toward the end portions of the face 12b. In other words, the liquid can be gathered at both end portions of the face 12b. The liquid can be discharged easily to the outside of the lower case 12 when a discharge port (not shown) is formed at the end portion of the face 12b.

The face 12b formed of the protruding face enables varying amounts of air to reach the battery modules 20 depending on the position in the battery module 20 (the position in the left-right direction of FIG. 8).

Since the distance between the central portion of the face 12b and the bottom faces of the battery modules 20 is the shortest in the present embodiment, a pressure loss is larger and the air is moved less easily in that portion than the other portions. In addition, since the distance between each end portion of the face 12b and the bottom faces of the battery modules 20 is the longest, the pressure loss is smaller and the air is moved more easily in that portion than the other portions.

When the temperature at both end portions of the battery modules 20 is higher than the temperature at the other portion (central portion) in the left-right direction of FIG. 8, the lower case 12 according to the present embodiment can be used to suppress the variations in temperature of the battery modules 20 in the left-right direction of FIG. 8. Since the plurality of cells 21 are placed side by side in the left-right direction of FIG. 8 in the present embodiment, variations in temperature can be suppressed among the plurality of cells 21. This can improve the input/output performance of the battery module 21.

If variations occur in the temperature of the plurality of cells 21 included in the battery module 20, variations may also occur in the output from the cells 21. In such a case, the charge and discharge of the battery module 20 is controlled sometimes by using the cell 21 having the lowest output as a reference, and the other cells 21 cannot be utilized efficiently. To address this, the variations in the temperature of the cells 21 can be suppressed as in the present embodiment to utilize the plurality of cells 21 in the battery module 20 efficiently, thereby enhancing the output performance of the battery modules 20.

Figure 9:
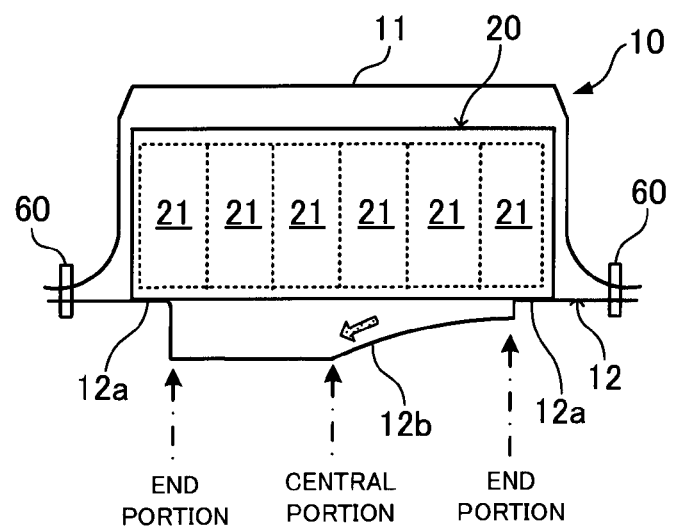
FIG. 9 A schematic diagram showing the inner structure of a battery pack when viewed from the arrangement direction of battery modules in a modification of Embodiment 1.

While the central portion of the face 12b of the lower case 12 is the closest to the bottom faces of the battery modules 20 in the present embodiment, the present invention is not limited thereto. For example, the lower case 12 may have a structure shown in FIG. 9. In the structure shown in FIG. 9, a region of the face 12b that is closer to one end portion than the central portion protrudes toward the battery modules 20, and a region closer to the other end portion than the central portion has a flat face. Such a structure can gather the liquid attached to the face 12b in the region closer to the other end portion. The structure shown in FIG. 9 can be used depending on the temperature distribution in the battery module 20 in the left-right direction of FIG. 9.

While the face 12b of the lower case 12 has the protruding face in the section orthogonal to the arrangement direction of the battery modules 20 in the present embodiment, the present invention is not limited thereto. Specifically, the face 12b of the lower case 12 may have a protruding face in a section including the arrangement direction of the battery modules 20. Such a configuration can also gather the liquid attached to the face 12b of the lower case 12 in a portion (concave portion), and the liquid can be easily discharged from that portion. When temperature variations occur in the arrangement direction of the battery modules 20, the variations can be suppressed.

When the temperature distribution in the plurality of battery modules 20 is previously measured, the shape of the face 12b of the lower case 12 can be determined on the basis of the measured results. For example, the relationship between the temperatures of the battery modules 20 and the distance between the battery modules 20 and the face 12b is previously determined, and the distance between the battery modules 20 and the face 12b can be determined on the basis of the measured temperature distribution.

While the temperature adjusting structure in the present embodiment includes all of the structure described in FIG. 3 to FIG. 5, the structure described in FIG. 6 and FIG. 7, and the structure described in FIG. 8, only one of these structures may be included.

The invention claimed is:

1. A temperature adjusting structure which adjusts a temperature of an electric storage module mounted on a vehicle, comprising:
an intake path configured to take in air in a vehicle interior from an intake port and guide the air to the electric storage module located below a horizontal plane on which the intake port is located,
wherein:
the intake path includes a bottom face and an upper face,
the bottom face of the intake path has an inclined face extending in an upward direction from a lower end portion of the intake port and facing the intake port, and
an opening plane of the intake port is substantially orthogonal to the horizontal plane or is inclined with respect to the horizontal plane to be directed upward.

2. The temperature adjusting structure according to claim 1, wherein the intake path has a first duct and a second duct connected to the first duct and located upstream from the first duct in a movement path of the air, and
in a connecting portion of the first and second ducts, an end portion of the second duct is located inside the first duct and an inner face of the first duct located in a bottom portion of the first duct is separate from an outer face of the second duct in a state in which the inner face of the first duct is opposite to the outer face of the second duct in a vertical direction.

3. The temperature adjusting structure according to claim 2, wherein the intake path guides the air to the electric storage module from a side where a bottom face of the electric storage module is located, and
the intake path has a protruding face and a discharge port,
the protruding face which is formed in a region opposite to the bottom face of the electric storage module in a vertical direction and protrudes toward the bottom face of the electric storage module, the discharge port which is configured to discharge a foreign matter moved downward along the protruding face to the outside of the intake path.

4. The temperature adjusting structure according to claim 3, wherein the protruding face is formed such that a distance between the protruding face and a first region of the bottom face of the electric storage module in the vertical direction is larger than a distance between the protruding face and a second region of the bottom face of the electric storage module in the vertical direction, the second region having higher heat radiation than the first region.

5. The temperature adjusting structure according to claim 1, wherein the intake path guides the air to the electric storage module from a side where a bottom face of the electric storage module is located, and
the intake path has a protruding face and a discharge port,
the protruding face which is formed in a region opposite to the bottom face of the electric storage module in a vertical direction and protrudes toward the bottom face of the electric storage module, the discharge port which is configured to discharge a foreign matter moved downward along the protruding face to the outside of the intake path.

6. The temperature adjusting structure according to claim 5, wherein the protruding face is formed such that a distance between the protruding face and a first region of the bottom face of the electric storage module in the vertical direction is larger than a distance between the protruding face and a second region of the bottom face of the electric storage module in the vertical direction, the second region having higher heat radiation than the first region.

7. The temperature adjusting structure according to claim 1, wherein the bottom face of the intake path is directly connected to the lower end portion of the intake port.

* * * * *